US010118347B2

(12) United States Patent
Stauffer et al.

(10) Patent No.: US 10,118,347 B2
(45) Date of Patent: Nov. 6, 2018

(54) APPARATUSES FOR LAYUP TOOLING

(71) Applicant: THE BOEING COMPANY, Chicago, IL (US)

(72) Inventors: Matthew S. Stauffer, West Chester, PA (US); Douglas R. Ludin, Malvern, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/450,832

(22) Filed: Mar. 6, 2017

(65) Prior Publication Data

US 2017/0173896 A1    Jun. 22, 2017

Related U.S. Application Data

(62) Division of application No. 14/278,205, filed on May 15, 2014, now Pat. No. 9,597,843.

(51) Int. Cl.
*B29C 33/00* (2006.01)
*B29C 70/30* (2006.01)
(Continued)

(52) U.S. Cl.
CPC .......... *B29C 70/30* (2013.01); *B29C 33/0011* (2013.01); *B29C 33/76* (2013.01);
(Continued)

(58) Field of Classification Search
CPC ......... B29C 41/40; B29C 33/76; B29C 53/82; B29C 70/32; B29C 70/30; B29C 70/38;
(Continued)

(56) References Cited

U.S. PATENT DOCUMENTS 3,273,817 A    9/1966  Damiron
4,158,586 A *  6/1979  Usui ................ B29C 33/485
                                        138/125
(Continued)

FOREIGN PATENT DOCUMENTS

CN    1454176 A    11/2003
EP    0142697 A1    5/1985
(Continued)

OTHER PUBLICATIONS

EPO Search Report for EP Application No. 15167862.0 dated Sep. 22, 2015.
(Continued)

*Primary Examiner* — Robert J Grun
*Assistant Examiner* — Jerzi H Moreno Hernandez
(74) *Attorney, Agent, or Firm* — Joseph F. Harding; The Small Patent Law Group LLC

(57) ABSTRACT

A tool for laying up composite material to form a workpiece having a target contour is disclosed. The tool includes a support structure including an elongated member having a longitudinal axis, and support plates connected to the elongated member and spaced apart from each other along the longitudinal axis. The elongated member includes a metallic material. The tool also includes a non-metallic backing structure connected to the support plates, the non-metallic backing structure comprising a working surface that includes a backing contour complementary to the target contour.

19 Claims, 10 Drawing Sheets

(51) Int. Cl.
*B29C 70/32* (2006.01)
*B29C 70/38* (2006.01)
*B29C 53/82* (2006.01)
*B29C 33/76* (2006.01)
*B29C 41/40* (2006.01)
*B29L 31/30* (2006.01)

(52) U.S. Cl.
CPC .............. *B29C 41/40* (2013.01); *B29C 53/82* (2013.01); *B29C 70/32* (2013.01); *B29C 70/38* (2013.01); *B29K 2879/085* (2013.01); *B29K 2905/02* (2013.01); *B29K 2995/0017* (2013.01); *B29L 2031/3076* (2013.01); *B29L 2031/3082* (2013.01)

(58) Field of Classification Search
CPC ......... B29C 33/0011; B29L 2031/3082; B29L 2031/3076; B29K 2879/085; B29K 2905/02; B29K 2995/0017
See application file for complete search history.

(56) References Cited

U.S. PATENT DOCUMENTS

| | | | |
|---|---|---|---|
| 4,233,020 A * | 11/1980 | Oswald | B29C 33/485 |
| | | | 156/425 |
| 4,462,787 A * | 7/1984 | Bogardus, Jr. | B29C 53/824 |
| | | | 249/179 |
| 4,581,086 A * | 4/1986 | Gill | B29C 53/821 |
| | | | 156/175 |
| 5,256,237 A * | 10/1993 | Maas | B29C 43/18 |
| | | | 156/156 |
| 5,266,137 A * | 11/1993 | Hollingsworth | B29C 53/824 |
| | | | 156/156 |
| 5,746,553 A | 5/1998 | Engwall | |
| 5,780,075 A * | 7/1998 | Huvey | B29C 37/005 |
| | | | 156/172 |
| 6,012,883 A | 1/2000 | Engwall et al. | |
| 6,168,358 B1 | 1/2001 | Engwall et al. | |
| 6,378,836 B1 | 4/2002 | Anthony | |
| 6,808,155 B2 | 10/2004 | Anthony | |
| 7,083,698 B2 | 8/2006 | Engwall et al. | |
| 7,166,251 B2 | 1/2007 | Blankinship | |
| 7,611,601 B2 | 11/2009 | Nelson et al. | |
| 8,714,226 B2 * | 5/2014 | Senibi | B29C 70/32 |
| | | | 156/425 |
| 9,597,843 B2 * | 3/2017 | Stauffer | B29C 70/30 |
| 2004/0020586 A1 * | 2/2004 | Blankinship | A61L 29/041 |
| | | | 156/195 |
| 2004/0228995 A1 | 11/2004 | Boaz et al. | |
| 2006/0231682 A1 * | 10/2006 | Sarh | B29C 70/32 |
| | | | 244/119 |
| 2008/0182054 A1 | 7/2008 | Ridges et al. | |
| 2010/0052203 A1 | 3/2010 | Inazawa | |
| 2010/0155984 A1 | 6/2010 | Hollensteiner et al. | |
| 2011/0158304 A1 | 6/2011 | Walker et al. | |
| 2012/0224878 A1 * | 9/2012 | Ikebuchi | G03G 15/2039 |
| | | | 399/70 |
| 2013/0014889 A1 | 1/2013 | Miller et al. | |
| 2014/0246141 A1 * | 9/2014 | Oldroyd | B29C 33/02 |
| | | | 156/175 |

FOREIGN PATENT DOCUMENTS

| | | |
|---|---|---|
| EP | 2062814 A1 | 5/2009 |
| EP | 2631062 A1 | 8/2013 |
| WO | 0196223 A2 | 12/2001 |
| WO | 2007148301 A2 | 12/2007 |
| WO | 2013102462 A1 | 7/2013 |

OTHER PUBLICATIONS

EPO Examination Report for copending EP Application No. 15167862.0 dated May 30, 2017. (5 pages).

English Translation of a Search Report for copending CN Application No. 201510249654.2 dated Feb. 24, 2018 (5 pages).

* cited by examiner

APPARATUSES FOR LAYUP TOOLING

RELATED APPLICATIONS

This application is a divisional application of U.S. patent application Ser. No. 14/278,205 (now U.S. Pat. No. 9,597,834), filed May 15, 2014, entitled "Method and Apparatus for Layup Tooling," the entire subject matter of which is incorporated by reference herein.

BACKGROUND

Layup tools may be used to provide surfaces upon which composite materials may be applied and allowed to cure to form desired shapes.

Traditional layup tools may be made of metallic or composite materials. Fabrication time and cost of metallic layup tools may be prohibitive for prototype or developmental programs. Fabrication of composite layup tools is also costly and time-consuming, since additional molding steps are needed to produce the complex working surfaces of such tools. The time and/or cost to fabricate composite layup tools may be prohibitive for prototype or developmental programs. Moreover, tools utilizing low-cost materials, such as plaster, foam, etc., may lack the strength and/or reliability needed in robotic composite manufacturing applications.

SUMMARY

Accordingly, apparatus and method, intended to address the above-identified concerns, would find utility.

One example of the present disclosure relates to a tool for laying up composite material to form a workpiece having a target contour. The tool includes a support structure including an elongated member having a longitudinal axis, and support plates connected to the elongated member and spaced apart from each other along the longitudinal axis. The elongated member includes a metallic material. The tool also includes a non-metallic backing structure connected to the support plates, the non-metallic backing structure including a working surface that includes a backing contour complementary to the target contour.

One example of the present disclosure relates to a method of forming a tool for laying up composite material to form a workpiece having a target contour. The method includes additively manufacturing a non-metallic backing structure comprising a working surface that includes a backing contour complementary to the target contour. The method also includes manufacturing a support structure comprising support plates and an elongated member. Further, the method includes attaching the non-metallic backing structure to the support structure.

One example of the present disclosure relates to a method of forming a tool for laying up composite material to form a workpiece having a target contour. The method includes forming a non-metallic backing structure comprising a working surface that includes a backing contour complementary to the target contour. The non-metallic backing structure has a first thermal coefficient of expansion. The method also includes forming a support structure comprising support plates and an elongated member having a second thermal coefficient of expansion different from the first thermal coefficient of expansion. Further, the method includes attaching the non-metallic backing structure to the support structure.

BRIEF DESCRIPTION OF THE DRAWINGS

Figure 1:
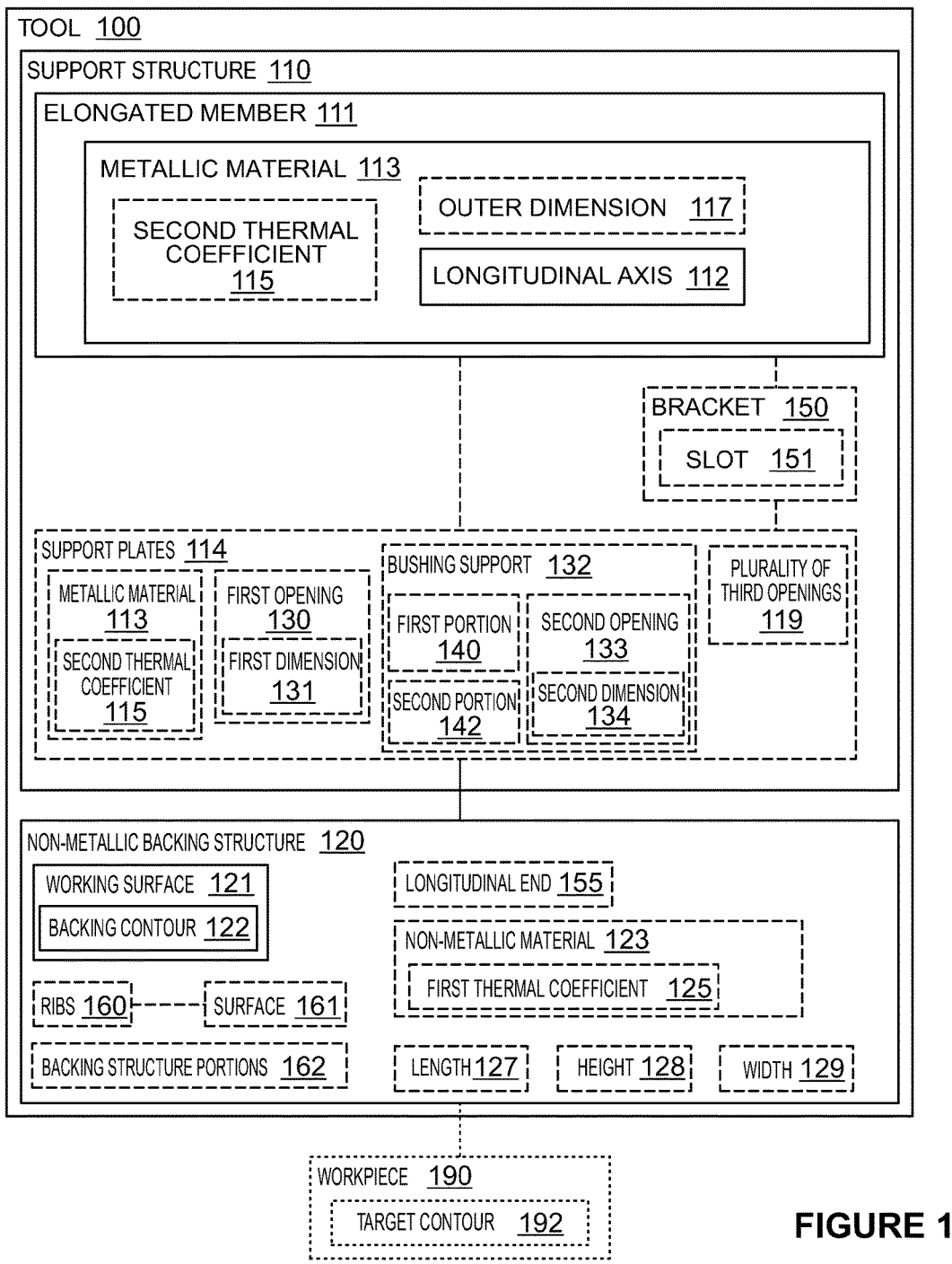
Figure 2:
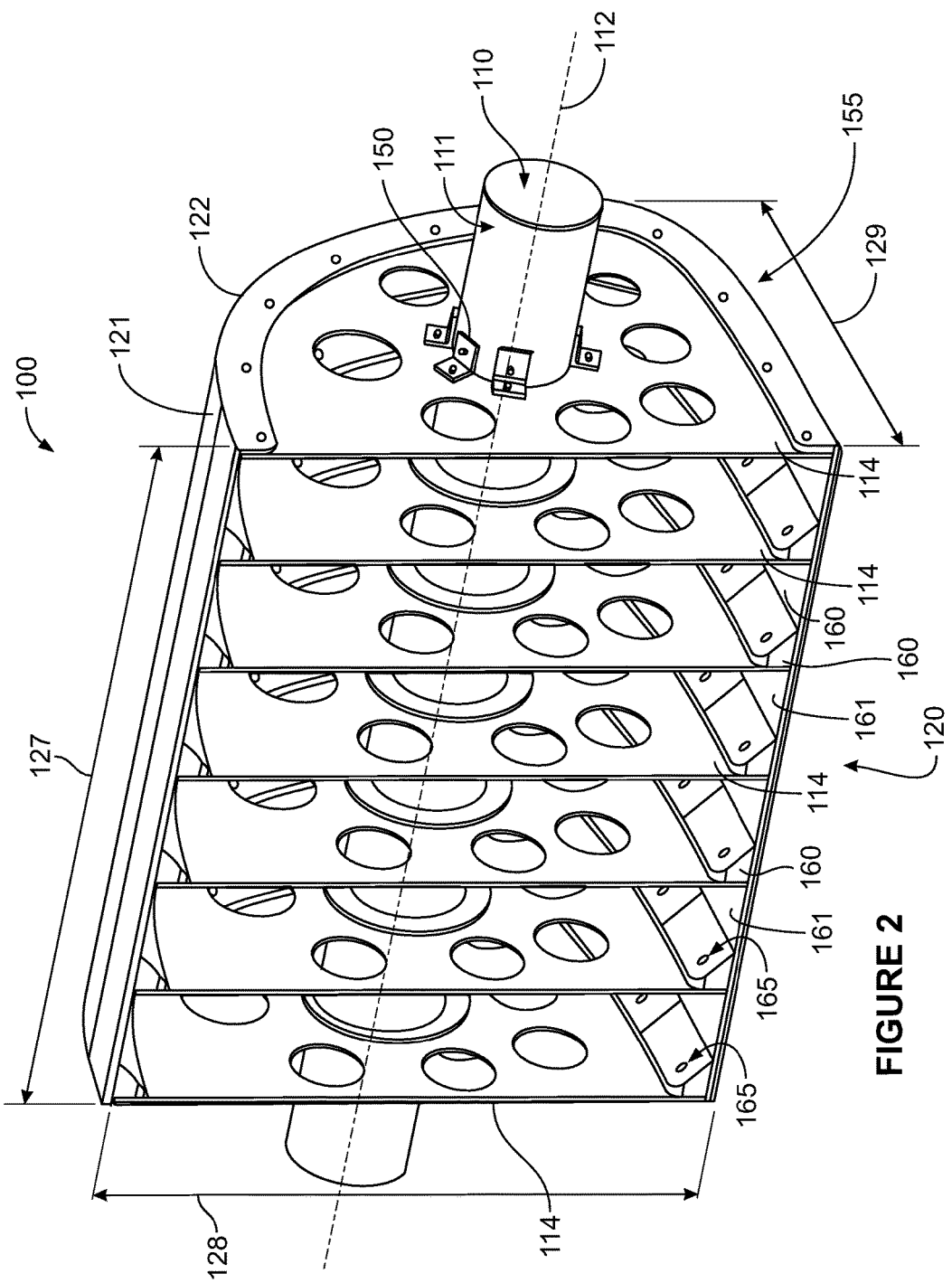
Figure 3:
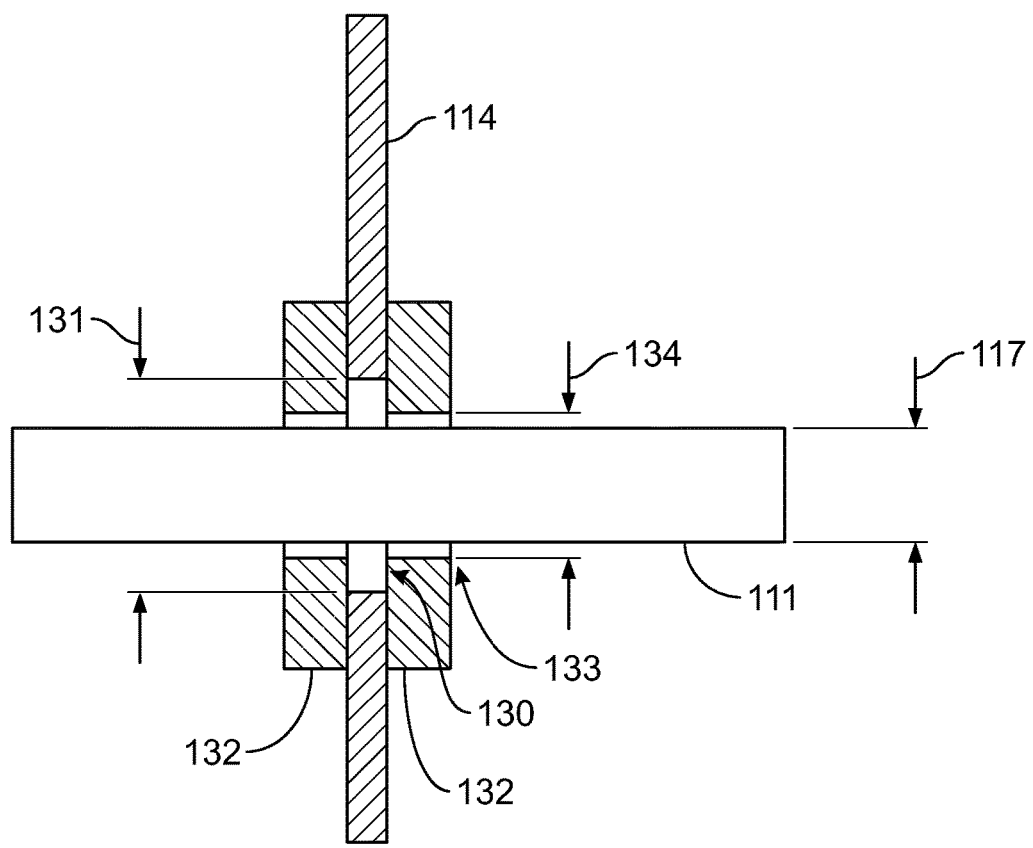
Figure 4:
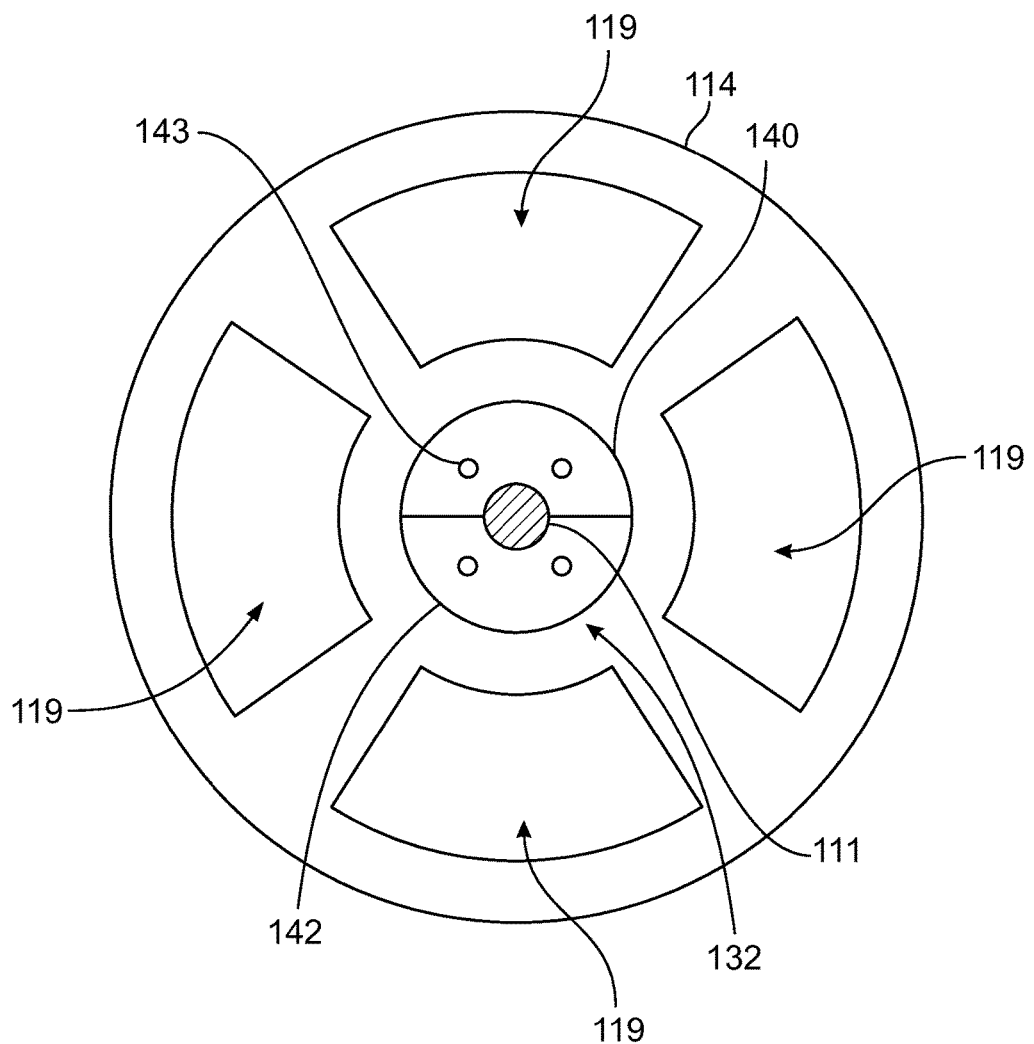
Figure 5:
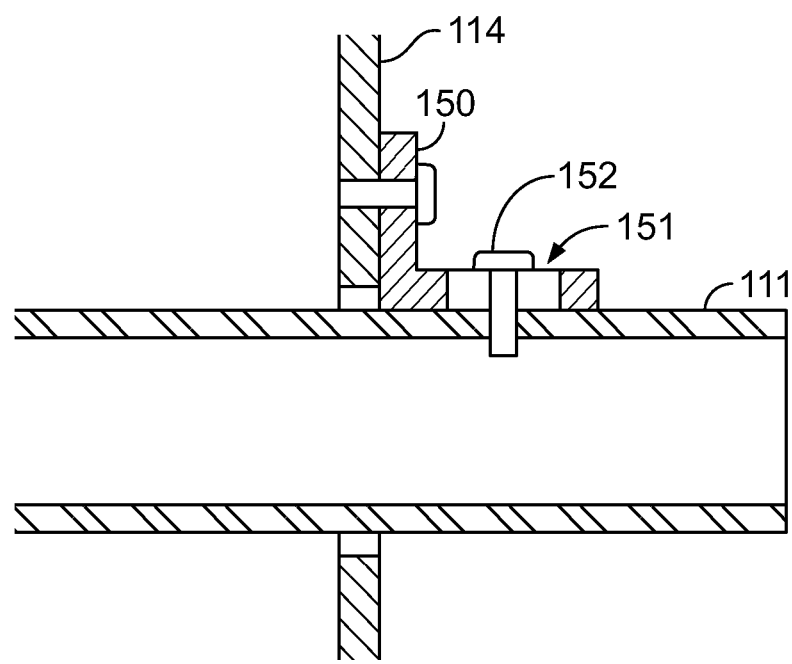
Figure 6:
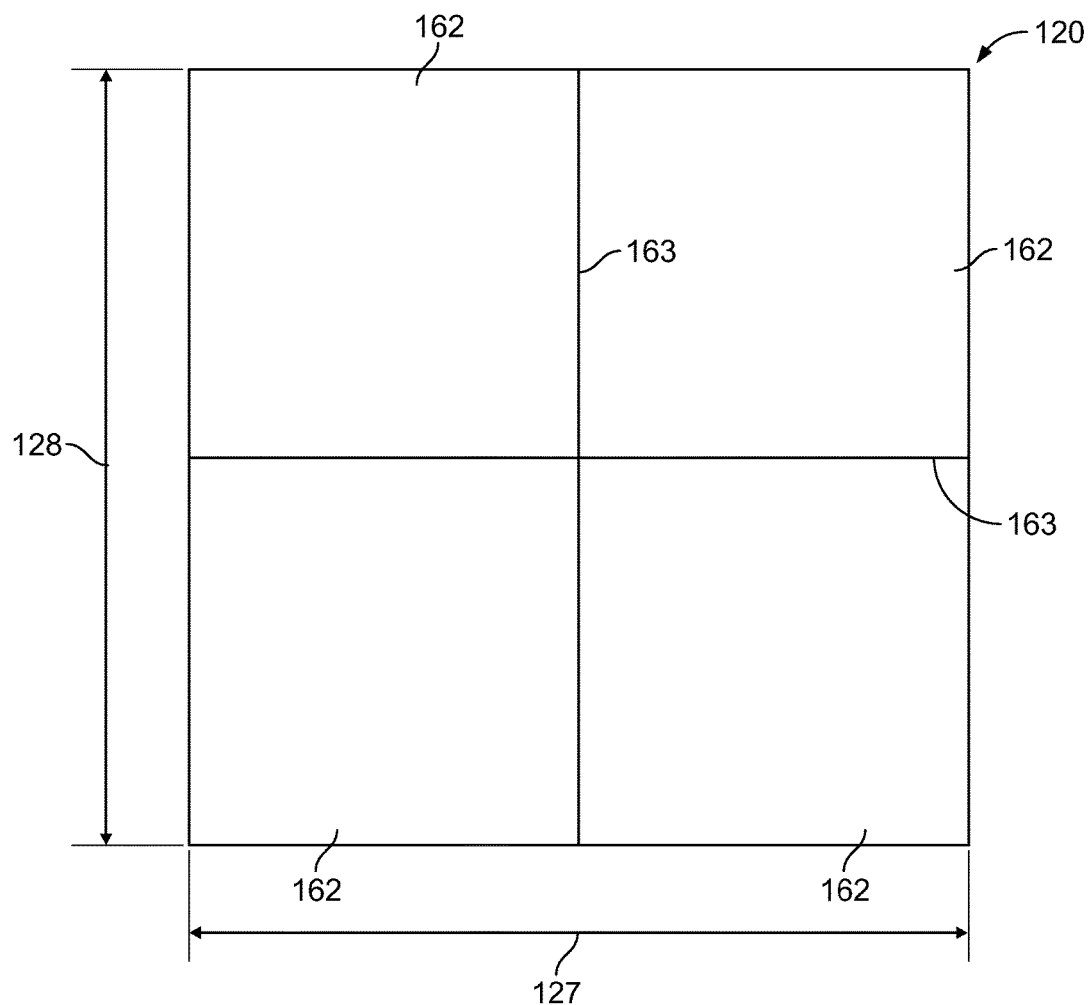
Figure 7:
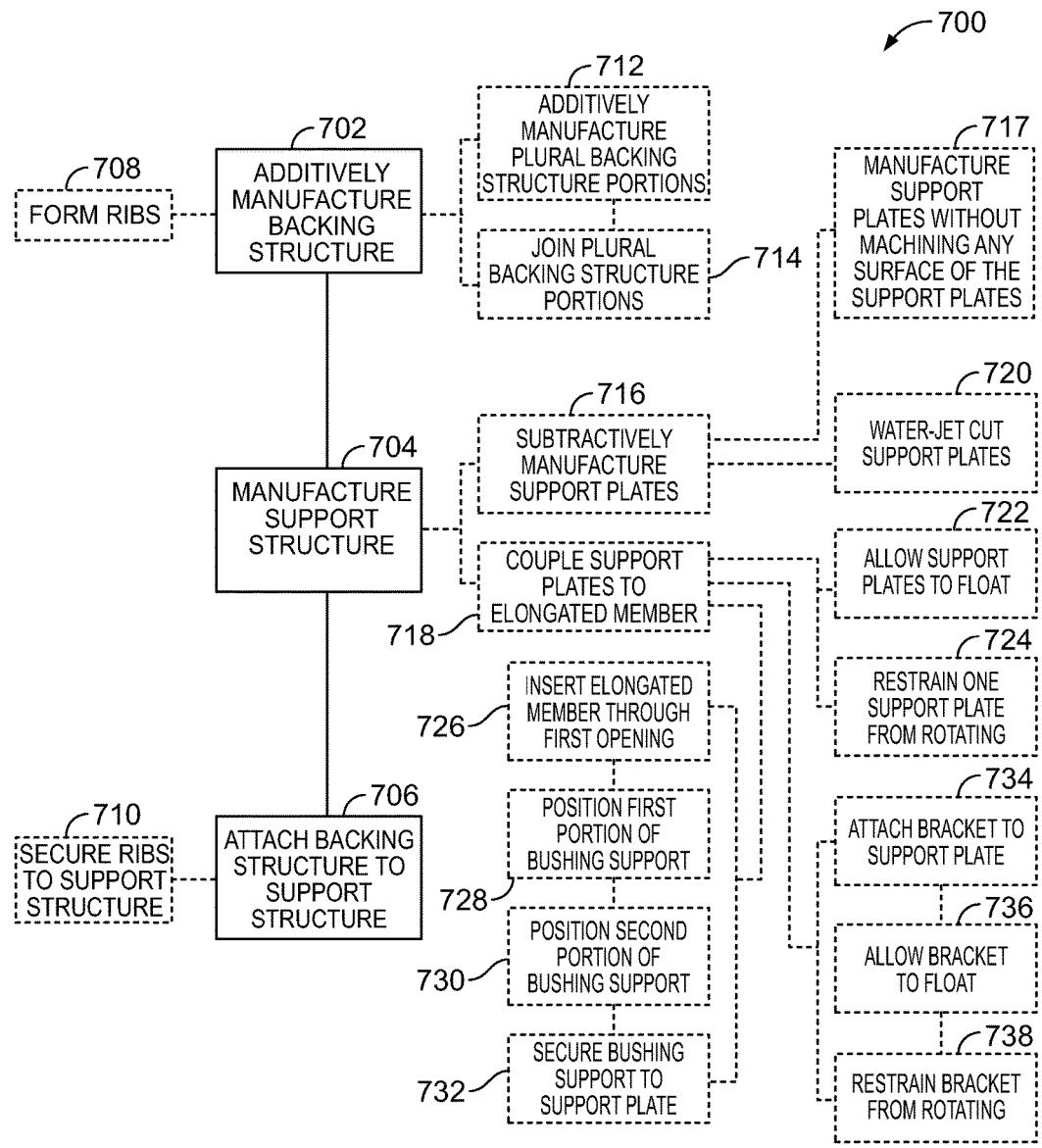
Figure 8:
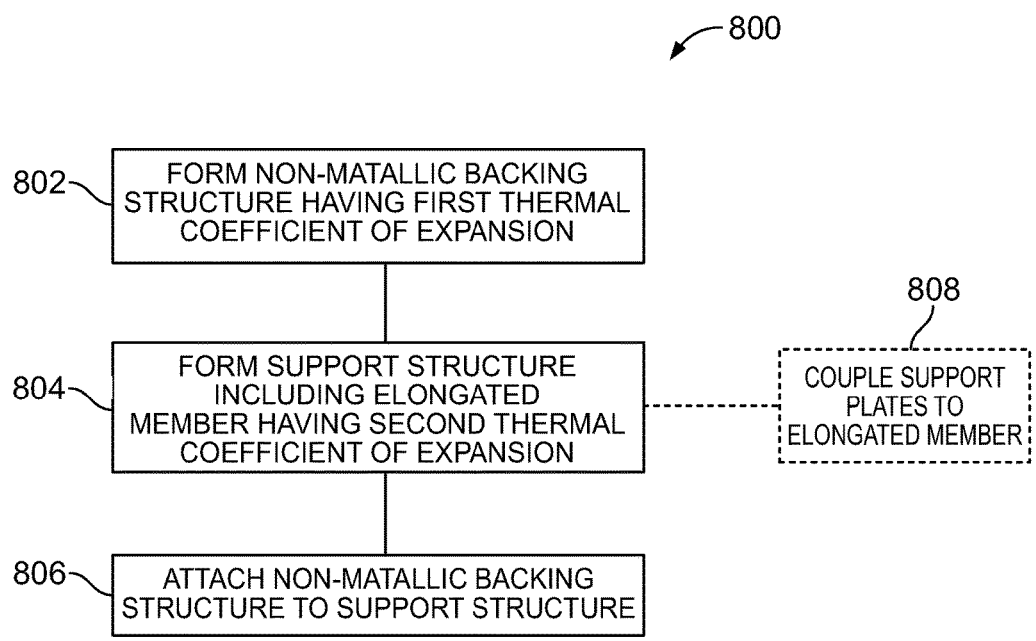
Figure 9:
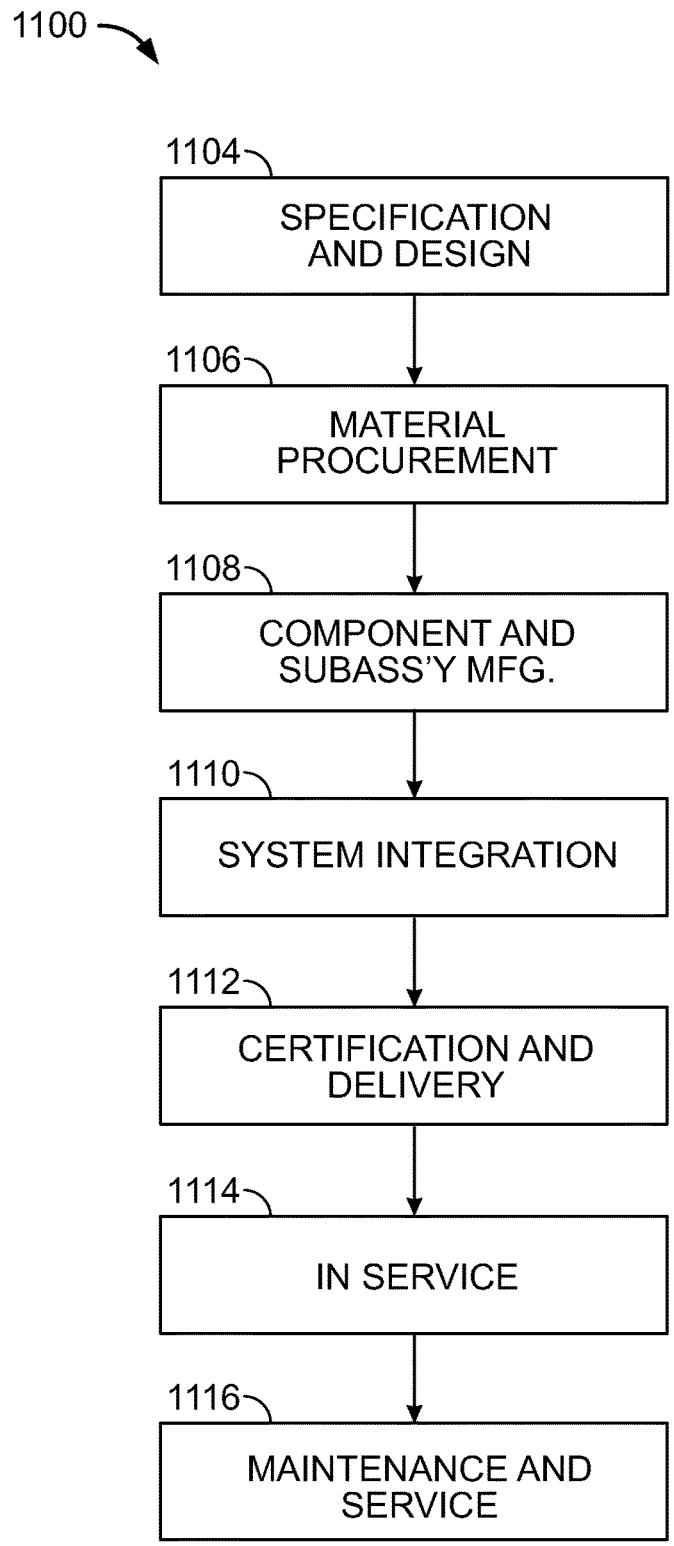

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a layup tool, according to one aspect of the present disclosure;

FIG. 2 is a schematic perspective sectional view of the tool of FIG. 1, according to one aspect of the disclosure;

FIG. 3 is a schematic side sectional view of a support plate of the tool of FIG. 1 mounted to an elongated member with a bushing support, according to one aspect of the disclosure;

FIG. 4 is a schematic end sectional view of the support plate and elongated member of FIG. 3, according to one aspect of the disclosure;

FIG. 5 is a schematic view of a bracket mounting for a support plate of the tool of FIG. 1, according to one aspect of the disclosure;

FIG. 6 is a schematic side view of a non-metallic backing structure of the tool of FIG. 1, according to one aspect of the disclosure;

FIG. 7 is a block diagram of a method for forming a tool for laying up composite material, according to one aspect of the disclosure;

FIG. 8 is a block diagram of a method for forming a tool for laying up composite material, according to one aspect of the disclosure;

FIG. 9 is a block diagram of aircraft production and service methodology; and

Figure 10:
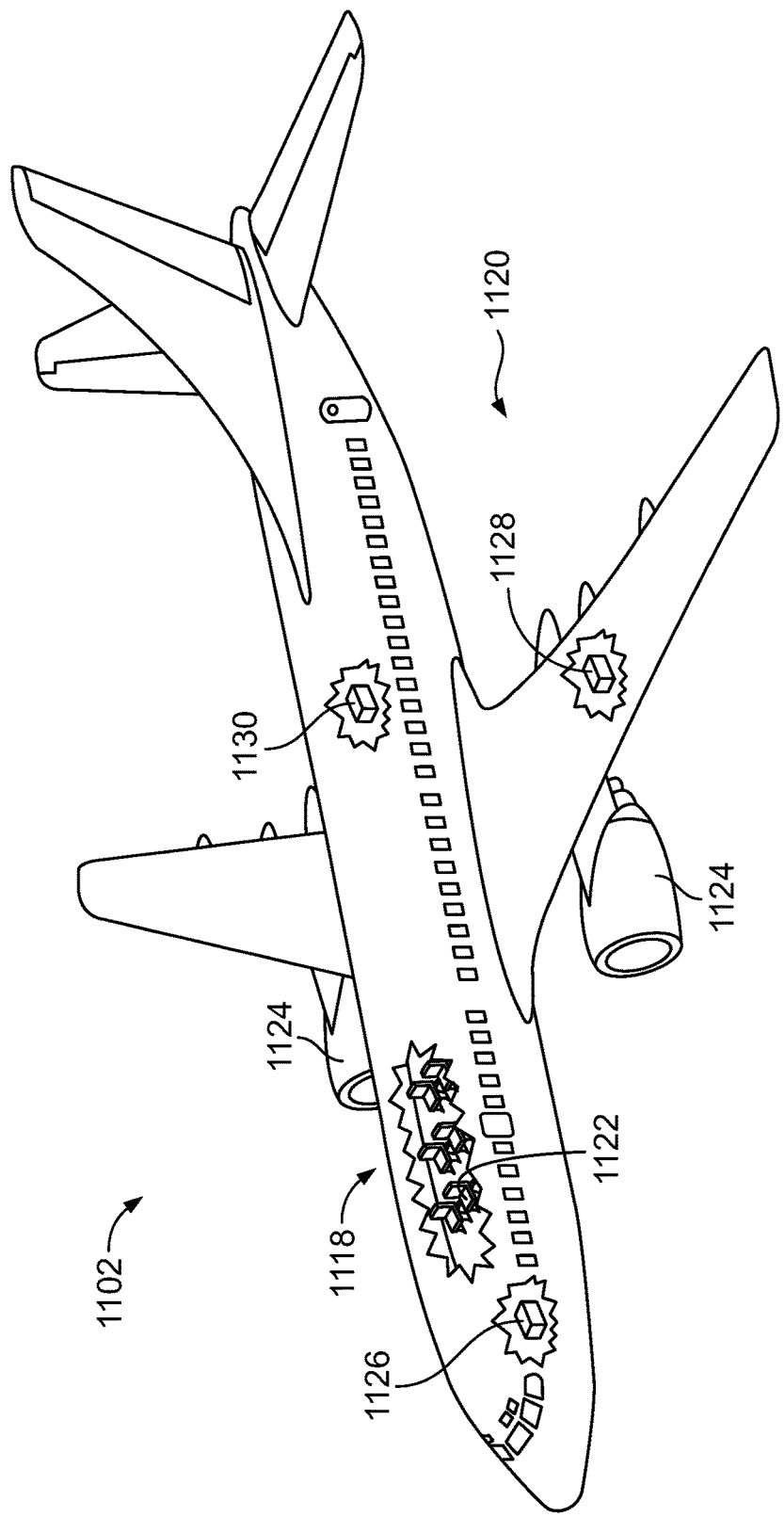

FIG. 10 is a schematic illustration of an aircraft.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring generally to FIGS. 1-6, and with particular reference to FIG. 1, one example of the present disclosure relates to a tool 100 for laying up composite material to form a workpiece 190 having a target contour 192. The tool 100 includes a support structure 110 including an elongated member 111 having a longitudinal axis 112, and support plates 114 connected to the elongated member 111 and spaced apart from each other along the longitudinal axis 112. The elongated member 111 includes a metallic material 113. The tool 100 also includes a non-metallic backing structure 120 connected to the support plates 114. The non-metallic backing structure 120 includes a working surface 121 that includes a backing contour 122 complementary to the target contour 192.

Generally, the support structure 110 provides support to the non-metallic backing structure 120, with the non-metallic backing structure 120 configured to provide a working surface 121 on which a composite (e.g., workpiece 190) may be formed. The working surface 121 of the illustrated embodiment includes the backing contour 122 covering at least a portion of the working surface 121. The tool 100 may be used for a robotic layup assembly process. For example, the entire tool 100 may be rotated about the longitudinal axis 112 during use, with material added to the working surface 121 of the non-metallic backing structure 120 as the tool 100 rotates. The material may impact against the working surface 121, with the support structure 110 providing support to the working surface 121. The tool 100 may also be used during assembly processes that take place under heating (e.g., to cure a composite material used for the workpiece 190). For example, in some embodiments, the tool may be used in environments heated up to about 350 degrees Fahrenheit.

The backing contour 122 has a shape that is complementary to the shape of the target contour 192 of the workpiece 190. The workpiece 190 may be understood as a composite product formed using the tool 100 (e.g., using the tool 100 during a robotic layup assembly during which composite material is applied to the working surface 121 of the tool 100, formed, and allowed to cure). The target contour 192 may include a relatively complex and/or compound curved contour, for example for a portion of an airplane. The backing contour 122 may be understood to have a shape that is complementary to the target contour 192 in that the shape and size of the backing contour 122 may be similar to the target contour 192, but may have some differences, for example, to account for a thickness of material used to form the workpiece 190 and the target contour 192, and/or to account for changes in shape of the workpiece 190 when removed from the tool 100. The non-metallic backing structure 120 may be formed using an additive manufacturing process (e.g., 3D printing) to allow for relatively quickly, conveniently, and/or cost-effectively forming a complex shape such as the backing contour 122. In 3D printing or additive manufacturing, successive layers of material may be laid down in different shapes to form a structure. In 3D printing, successive layers of liquid, powder, or sheet material, among others, may be applied to construct a structure.

In the illustrated embodiment, the support plates 114 are distributed along a length of the elongated member 111, or along the longitudinal axis 112 of the elongated member 111. The spacing between the support plates 114, as well as the thickness of the support plates 114, may be selected or designed to provide sufficient rigidity or strength to the non-metallic backing structure 120, for example to prevent the non-metallic backing structure from bowing, flexing, or otherwise being affected by the application of composite materials by a robot during a robotic composite manufacturing process to an extent that may damage the tool 100 and/or appreciably affect the quality of the workpiece 190 formed using the tool 100. The support plates 114 may be designed to be light weight, easy to manufacture and assemble, and/or have a low cost.

As discussed herein, the non-metallic backing structure 120 may be manufactured, for example, using additive manufacturing processes, such as 3D printing. Accordingly, in various embodiments, the non-metallic backing structure 120 may be understood as being made from an additively manufactured material, in contrast to traditionally formed composites (e.g., composites formed using traditional molding, curing, and/or layup processes) and traditionally formed metallic objects (e.g., materials formed using one or more of casting, welding, machining, forging, or cutting, among others). All or a portion of the non-metallic backing structure 120 may be made for example, of plastic or polymer suited for additive manufacturing. It may be noted that, in some embodiments, additive manufacturing may be particularly well suited for quickly and cost-effectively forming a complex shape, such as the backing contour 122 to be used as part of a prototyping, developmental, or limited run process. Other forming techniques may be more cost effective, at least in some circumstances, for example, for higher run production applications. However, while forming the non-metallic backing structure 120 from an additively manufactured material may be particularly advantageous for certain prototyping or limited run applications, it should be noted that, in alternate embodiments, an additively manufactured or other non-metallic material may be utilized with the tool 100 being used in production or larger volume runs.

Referring, e.g., to FIGS. 1 and 2, in one aspect of the disclosure, which may include at least a portion of the subject matter of any of the preceding and/or following examples and aspects, the non-metallic backing structure 120 is comprised of a polyetherimide (PEI) material. PEI is an amorphous thermoplastic, and various PEI materials may be utilized in 3D printing or additive manufacturing. One example of a PEI material that may be used in various embodiments is Ultem, such as Ultem 1000, which is an unfilled PEI. In some embodiments, the non-metallic backing structure 120 may be substantially entirely composed of Ultem that has been 3D printed or additively manufactured to form the non-metallic backing structure 120 including the backing contour 122. In other embodiments, the non-metallic backing structure 120 may include additional aspects or components that are joined (e.g., fastened, epoxied, or otherwise secured) to an additively manufactured portion or portions.

Relatively complex structures or shapes may be readily formed using additive manufacturing. The relatively complex structures or shapes may be, as discussed above, for the backing contour 122 that has a complementary shape to the target contour 192. Further, complex structures or shapes may be formed for other aspects of the non-metallic backing structure 120, such as mounting and/or support features. For example, referring, e.g., to FIGS. 1 and 2, in one aspect of the disclosure, which may include at least a portion of the subject matter of any of the preceding and/or following examples and aspects, the non-metallic backing structure 120 includes ribs 160 located on a surface 161 opposite the working surface 121, and the support plates 114 of the support structure 110 are connected to the ribs 160. The ribs 160, for example, may be formed during a single additive manufacturing process that forms the backing contour 122 of the working surface 121. Further still, 3D printing or additive manufacturing may be used to form holes 165 in the ribs 160 to accept fasteners (not shown) for securing the non-metallic backing structure 120 to the support plates 114. Thus, in some embodiments, the entire non-metallic backing structure 120, including ribs 160 for support and convenient mounting to the support plates 114, may be formed in a single pass or single 3D printing operation.

It may be noted that conventional or readily available 3D printers may have certain practical limits on the size of structures that may be printed or additively manufactured in a single pass by a single machine or device. For example, some 3D printers may not be configured to produce structures that have a dimension greater than about 36 inches. However, the workpiece 190 in various embodiments may have one or more dimensions greater than 36 inches, and, accordingly, the working surface 121 of the non-metallic backing structure 120 may be desired to have one or more dimensions greater than 36 inches. In various embodiments, the non-metallic backing structure 120, including the working surface 121, may be formed from different additively manufactured portions that are joined to form the non-metallic backing structure.

For example, as shown in FIG. 6, the non-metallic backing structure 120 may be made of plural backing structure portions 162. The plural backing structures 162 may be separately formed, with each individual backing structure 162 having no dimensions greater than a predetermined maximum available manufactured length (e.g., 36 inches), but with the entire non-metallic backing structure 162 having at least one dimension greater than the predetermined maximum available manufactured length when the plural backing structures 162 are joined to form the non-metallic backing structure 120. The plural backing structures 162 may be joined, for example, with epoxy, using butt joints (which may include pins and openings for piloting) between adjacent backing structures 162. Further, seams 163 formed at the joints between adjacent backing structures 162 may be filled in, sanded and/or otherwise finished to provide a generally smooth and continuous working surface 121. Thus, one or more dimension of the working surface 121 and/or other aspect of the non-metallic backing structure 120 may exceed a size limit available from known, cost-effective, and/or readily available additive manufacturing equipment (e.g., 3D printers).

For example, referring, e.g., to FIGS. 1, 2, and 6, in one aspect of the disclosure, which may include at least a portion of the subject matter of any of the preceding and/or following examples and aspects, the non-metallic backing structure 120 has a length 127, a height 128, and a width 129, and at least one of the length 127, the height 128, or the width 129 is greater than 36 inches. Thus, for example, to produce a working surface 121 having a length 127 of about 70 inches and a height 128 of about 40 inches using a 3D printer limited to producing structures having dimensions of 36 inches or less, individual backing structures 162 having a length of about 35 inches and a width of about 20 inches may be joined as shown in FIG. 6. The particular sizes and shapes discussed or shown in connection with FIG. 6 are meant by way of example only for illustrative purposes, and other sizes and/or shapes of backing structures 162 and/or non-metallic backing structures 120 may be utilized in various embodiments.

As discussed herein, the non-metallic backing structure 120 may be conveniently and readily made (e.g., using additive manufacturing) to have a complex shape to match a complex contour (e.g., the target contour 192). The complex shape of the non-metallic structure 120 (e.g., working surface 121) may be formed relatively quickly and cost-effectively, for example, for use in a prototype application where reduced time of fabrication may be particularly advantageous. However, it may be noted that manufacturing entire the entire tool 100 (e.g., the support structure 110 as well as the non-metallic backing structure 120) using 3D printing or additive manufacturing may be expensive or cost-prohibitive, for example, due to material costs of materials suited for additively manufacturing a structure of sufficient rigidity or strength. Accordingly, in some embodiments, the support structure 110, as mentioned above, may have the elongated member 111 made from a metallic material (e.g., the metallic material 113). In various applications, metallic materials may be more cost effective and/or convenient for forming the support structure 110, while additively manufactured materials may be more cost effective and/or convenient for the working surface 121 and the backing contour 122.

Referring, e.g., to FIGS. 1 and 2, in one aspect of the disclosure, which may include at least a portion of the subject matter of any of the preceding and/or following examples and aspects, the metallic material 113 includes aluminum. Aluminum may be a relatively lightweight material that still provides sufficient strength or rigidity, may be relatively easily formable to shapes utilized in the support structure 110 (e.g., via water jet-cutting), may be available in convenient configurations such as sheets that may be used for support plates 114 and tubes or other structural members that may be used for elongated members 111, and/or may be relatively affordable or cost effective.

A metallic material, such as Aluminum, may be utilized for at least the elongated member 111. In some embodiments, a metallic material (either the same as a metallic material used for the elongated member 111 or different) may also be used for the support plates 114. Different shapes of elongated members 111 and/or support plates 114 may be readily available and/or formable. For example, the depicted elongated member 111 is shown as generally circular, and may either be formed to suit a particular application, or made using a standard readily available tube size. In other embodiments, the elongated member 111 may have a different cross-sectional shape, such as a square or other polygon. Generally, the shape of the support plates 114 may be selected to be complementary to the non-metallic backing structure 120 to provide support to the working surface 121, to minimize flexing or bowing of the working surface 121 during application of a material during a composite forming process, or to maintain the flexing or bowing within acceptable levels.

It may be noted that use of aluminum or other metallic material may provide for convenient manufacture or forming of the support plates 114. For example, referring, e.g., to FIGS. 1, 2, and 4, in one aspect of the disclosure, which may include at least a portion of the subject matter of any of the preceding and/or following examples and aspects, the elongated member 111 has an outer dimension 117, the support plates 114 are comprised of the metallic material 113, and each of the support plates 114 includes a first opening 130, having a first dimension 131 greater than the outer dimension 117 of the elongated member 111. Each of the support plates 114 also includes a plurality of third openings 119 surrounding the first opening 130. For example, the support plates 114 may be made of a material such as Aluminum that may be water-jet cut or otherwise readily formed to a desired shape. The first dimension 131 of the first opening 130 may be sized so that the support plates 114 are easily fit around the elongated member 111 during assembly, for example with a relatively large clearance (e.g., a clearance larger than used for a free or loose running fit). With the first opening 130 configured to have such a clearance around the elongated member 111, the first opening 130 (as well as the rest of the support plate 114) may be formed without machining any surfaces of the support plate 114 in some embodiments.

The outer dimension 117 may be a diameter for embodiments where the elongated member 111 is a tube having a generally circular cross-section, or a width when the elongated member 111 has a different cross-section. The first opening 130 is sized so that the cross-section of the elongated member 111 fits entirely inside the cross-section of the first opening 130. In some embodiments, the first opening 130 may have a similar shape to the elongated member 111 (e.g., the first opening 130 may be generally circular with the first dimension 131 being a diameter that is larger than a diameter provided by the outer dimension 117), while in other embodiments, the first opening 130 may be a different shape (e.g., a square having a greater width than a diameter of a generally circular cross-section of the elongated member 111). In the illustrated embodiment, the third openings 119 are formed to reduce weight of the support plates 114, while still allowing adequate strength and/or rigidity to provide support to the working surface 121 of the non-metallic backing structure 120.

Thus, the tool 100 may utilize a non-metallic backing structure 120 (e.g., an additively formed non-metallic backing structure) for timely manufacture and convenient forming of complex shapes for the working surface 121 (e.g., the backing contour 122 of the working surface 121), while utilizing a metallic material for one or more components (e.g., elongated member 111, support plates 114) of the support structure 110, for example, for reduced cost of materials and cost-effective and/or convenient manufacture and assembly of the support structure 110. As indicated herein, the relatively timely manufacture and assembly of the tool 100 may be particularly advantageous in some embodiments for prototyping or other applications for which relatively quick fabrication of a layup tool may be desired or required.

However, the utilization of a metallic support structure (e.g., having an elongated member 111 made of the metallic material 113) in conjunction with the non-metallic backing structure 120 may, in various circumstances, provide challenges for effective utilization. It may be noted that the tool 100 may be used in environments where temperature may vary, and that changes in temperature may cause different thermal expansion of different parts (e.g., the non-metallic backing structure 120 and the metallic material 113 of the elongated member 111 may expand (or contract) differently during temperature changes due to different thermal expansion properties of the materials used). Because the elongated member 111 and the non-metallic backing structure 120 are operably coupled to each other via the support plates 114, if the elongated member 111 and non-metallic backing structure are rigidly coupled via the support plates 114, the difference in thermal expansion may result in various problems. If the changes in thermal expansion are sufficient enough and the non-metallic structure 120 and the elongated member 111 are coupled rigidly or substantially rigidly, internal stresses and/or strains may be caused that result in one or more of buckling of one or more aspects of the tool 100, damage to the tool 100 and/or the workpiece 190, bending of the non-metallic backing structure 120 (which may result in the working surface 121 and backing contour 122 deviating from a desired shape, and thereby resulting in an inappropriately formed workpiece 190 having a contour different than the target contour 192), or other issues affecting either the effective lifetime and/or maintenance cost of the tool 100 or quality of the workpiece 190 produced.

To address these issues and eliminate or reduce the potential issues caused by differing thermal expansions of the support structure 110, various embodiments utilize coupling structures that allow for relative movement between at least some of the support plates 114 (as well as the non-metallic backing structure 120 joined to the support plates 114) and the support structure 110 (e.g., movement of at least some of the support plates 114 relative to elongated member 111 along the longitudinal axis 112) to accommodate varying expansions of materials as the temperature of an environment of the tool 100 changes during use. (It may be noted that conventional layup tool approaches using a same or similar material for all or substantially all of a layup tool generally may not be faced with challenges due to variations of thermal expansion between materials of a layup tool.)

Referring, e.g., to FIGS. 1-5, in one aspect of the disclosure, which may include at least a portion of the subject matter of any of the preceding and/or following examples and aspects, all but one or all of the support plates 114 float relative to the elongated member 111 along the longitudinal axis 112 with a sliding fit. Thus, if the elongated member 111 and non-metallic support member 120 expand at different rates along their lengths (e.g., along the longitudinal axis 112), either all of the support plates 114 or all of the support plates 114 but one may move, allowing the non-metallic backing structure 120 to expand (or contract) a different amount than the elongated member without resulting in internal stresses or buckling, or other problems that may occur if the non-metallic backing structure 120 and the elongated member 111 were rigidly (or sufficiently rigidly) coupled. As used herein, the "floating" of the support plates 114 relative to the elongated member 111 may be understood as meaning that the connection of the support plates 114 along the length of the elongated member 111 to the elongated member 111 allows at least an effective amount of movement therebetween to address, for example, differences in thermal expansion between the elongated member 111 and the non-metallic backing structure 120 that is mounted to the support structure 110 via the support plates 114. The sliding fit is configured to provide for movement due to differing thermal expansion properties or characteristics of various components of the tool 100, such as the elongated member 111 and the non-metallic backing structure 120.

It may be noted that "floating," as used herein, does not necessarily require entirely free or entirely unconstrained motion. Instead, a limited range of motion, for example, may be allowed, and/or a limited resistance to motion may be present between a support plate 114 and the elongated member 111 that the support plate 114 floats relative to. For example, there may be some friction or other resistance in the sliding fit or interaction between the support plate 114 and the elongated member 111, and/or a mechanical member, such as a collar or stop, may limit an overall range of motion permitted. The particular sizes of openings or other aspects (as well as tolerances) of the tool 100 may be selected or designed to provide a desired amount of float or desired sliding fit or interaction, based on one or more of the materials used for the various components or structures, temperature range over which the tool 100 may be used, or sizes of components (e.g., length of elongated member 111 and non-metallic backing structure 120). It may also be noted that a support plate 114 may be understood as floating along the longitudinal axis 112 relative to the elongated member 111, even if the support plate is indirectly mounted to the elongated member in an additional location.

For example, in embodiments having a single fixed support plate 114, a given floating support plate 114 may be mounted to the elongated member 111 via a floating coupling or connection proximate a central point of the given floating support plate 114, and also mounted to the fixed support plate 114 via the non-metallic backing structure 120. However, because the non-metallic backing structure 120 may expand at a different rate than the elongated member 111, the floating support plate 114 is still free to float at least to some extent (albeit limited by the amount of expansion (or contraction) of the non-metallic backing structure 120 that differs from the expansion (or contraction) of the elongated member 111). In embodiments where all of the support structures 114 float relative to the elongated member 111, one or more collars or other mechanical stops may be employed to prevent the support plates 114 (with the non-metallic backing structure 120 attached thereto) from sliding off of the elongated member 111, and/or maintaining the non-metallic backing structure within a desired range of positions along the length of the elongated member 111. Use of a fixed support plate 114, for example, at a predetermined location along the length of the elongated member 111, may provide for reliable and effective location of the working surface 121 and backing contour 122 of the working surface 121 by a robot that applies composite material to the working surface 121.

In various embodiments, different structures may be employed to provide for floating between one or support plates 114 and the elongated member 111. For example, referring, e.g., to FIGS. 1-4, in one aspect of the disclosure, which may include at least a portion of the subject matter of any of the preceding and/or following examples and aspects, at least one of the support plates 114 includes the first opening 130 having the first dimension 131, and a bushing support 132 adjacent to the first opening 130. The bushing support 132 includes a second opening 133 having a second dimension 134 smaller than the first dimension 131. The second dimension 134 is sized to provide the sliding fit between the bushing support 132 and the elongated member 111 along the longitudinal axis 112. Generally, the bushing support 132 may be mounted to the support plate 114 (e.g., via bolts or other fasteners (not shown) and sized to have the sliding fit with the elongated member 111. Thus, the support plate 114 may not be directly coupled to the elongated member 111 or contact the elongated member 111, but may be indirectly coupled to the elongated member 111 via the bushing support 132 which contacts or directly couples with the elongated member 111. It may be noted that, in the illustrated embodiment, the tool 100 is shown with one bushing support 132 on each side of support plate 114; however, in alternate embodiments, the bushing support 132 may be provided on only one side of the support plate 114.

The first opening 130 may be shaped and dimensioned to provide for easy fitment, placement, or positioning of the elongated member 111 within the first opening 130. For example, the first opening 130 may be sized to provide a substantial clearance, or a clearance exceeding a loose or running sliding fit. In contrast, the second opening 133 of the bushing support 132 may be smaller than the first opening 130 to provide for the sliding fit between the support plate 114 and the elongated member 111. The first opening 130 thus provides for easy placement and positioning of the support plates 114 relative to the elongated member 111, while the second opening 133 helps insure that any movement of the support plates 114 in a radial direction perpendicular to the longitudinal axis 112 is eliminated, minimized, or reduced, allowing the elongated member 111 and support plates 114 to provide support to the working surface 121 of the non-metallic backing structure 120, for example, against forces due to impact of material being applied to the working surface 121 during a robotic composite forming process. Further, by using a clearance between the support plates 114 and the elongated member 111, the tolerances on the first openings 130 of the support plates 114 may be large enough to accommodate relatively convenient and/or inexpensive forming processes such as water-jet-cutting to be used instead of machining with the support plates 114. To the extent machining may be employed to provide tolerances for a sliding fit, the machining may be limited to the second opening 133 of the bushing support 132 and/or an exterior surface of the elongated member 111.

Thus, use of bushing supports 132 as disclosed herein may, in various embodiments, provide for easy manufacture, assembly, and/or maintenance or replacement of the tool 100 (e.g., the support plates 114). For example, the support plates 114, which may be relatively large and unwieldy, may be easily placed or positioned about the elongated member 111 due to the clearance provided between the first opening 130 and the elongated member 111. Further, the support plates 114 may be manufactured without machining any surfaces. Further still, to the extent there is any wear between the elongated member 111 and the bushing support 132, replacement of the smaller bushing support 132 (which is not directly attached to the non-metallic backing structure 120) may be substantially less expensive and more convenient than replacement of the support plate 114 (which is directly attached to the non-metallic backing structure 120). Generally, to assemble the tool 100, for example, the support plates 114 may be attached to the non-metallic structure 120, the elongated member 111 inserted through the first openings 130 of the support plates 114, and the bushing supports 132 positioned and secured in place. In the illustrated embodiment, the non-metallic backing structure 120 is open on one side (e.g., a side opposite the working surface 121), and the bushing supports 132 may be readily accessed for assembly, maintenance and repair.

Referring, e.g., to FIGS. 3 and 4, in one aspect of the disclosure, which may include at least a portion of the subject matter of any of the preceding and/or following examples and aspects, the bushing support 132 includes a first portion 140 and a second portion 142 separate from the first portion 140. To mount the bushing support 132 (and the corresponding support plate 114) to the elongated member 111, the first portion 140 and the second portion 142 may be positioned on opposite sides of the elongated member 111, brought towards each other to provide the sliding fit with the elongated member 111, and secured to the support plates 114 (e.g., with fasteners such as bolts or capscrews (not shown for ease and clarity of illustration)). It may be noted that the first portion 140 and the second portion 142 are shown in the illustrated embodiment as contacting each other; however, in various embodiments, the first portion 140 and second portion 142 may be separated by one or more gaps. Use of a split bushing support having the first portion 140 and the second portion 142, for example, may provide for improved ease and convenience of assembly (e.g., by not requiring insertion of the elongated member 111 through the smaller second opening 133 but instead only insertion through the larger first opening 130) and/or improved alignment or adjustability (e.g., by allowing individual bushing supports 132 to be adjustably positioned relative to the elongated member 111 with the elongated member 111 already in place in the first openings 130 of the support plates 114). As indicated above, the non-metallic backing structure 120 may be open on one side, allowing for ready, convenient access of the bushing supports 132 for assembly, inspection, maintenance, and/or replacement.

It may be noted that other mounting structures or configurations may be used additionally or alternatively to the use of one or more bushing supports as discussed herein. For example, referring, e.g., to FIGS. 1, 2, and 5, in one aspect of the disclosure, which may include at least a portion of the subject matter of any of the preceding and/or following examples and aspects, at least one of the support plates 114 is coupled to the elongated member 111 via at least one bracket 150 that is fixedly attached to the at least one of the support plates 114. The at least one bracket 150 floats relative to the elongated member 111 with a sliding fit along the longitudinal axis 112, and the at least one bracket 150 is restrained from rotating relative to the elongated member 111. The bracket 150 may be joined in different fashions to the elongated member 111 and the support plate 114, respectively. For example, the bracket 150 may be fixed rigidly or generally rigidly (e.g., utilizing a connection that allows little or no motion) to the support plate 114, for example using a fastener inserted through one or more holes having a relatively small clearance from the fastener. In contrast, the bracket 150 may joined to the elongated member 111 by a structure or structures that allow float with respect to elongated member 111 along the longitudinal axis 112 (e.g., via a mechanical member disposed within a track, rail, slot, or the like).

The bracket 150 may be disposed a radial distance from the longitudinal axis 112 sized to provide a sliding fit between the bracket 150 (as well as, optionally, one or more additional brackets 150). In some embodiments, one or more brackets 150 may be disposed a first radial distance from the longitudinal axis 112 or center of the elongated member 111 to provide for a sliding fit or relatively precise positioning of the support plate 114 relative to the elongated member 111, while other brackets 150 may be disposed at a second radial distance that is greater than the first distance, for example, for ease of assembly (e.g., the elongated member 111 may be initially positioned between brackets 150 at a greater radial distance before securing the brackets 150 at a lesser radial distance in place and to the elongated member 111).

Referring, e.g., to FIGS. 1, 2 and 5, in one aspect of the disclosure, which may include at least a portion of the subject matter of any of the preceding and/or following examples and aspects, the at least one bracket 150 is L-shaped and includes a slot 151. As seen in FIG. 5, the slot 151 extends along the longitudinal axis 112 and allows a limited range of float For example, the support plate 114 may float relative to the elongated member 111 until a fastener 152 disposed in the slot 151 contacts an end of the slot 151, providing a mechanical stop or limit to the amount or range of float between the support plate 114 coupled to the elongated member 111 via the bracket 150 and the elongated member 111.

The size of the slot 151 (e.g., the length of the slot 151) and the resulting range of allowed motion along the longitudinal axis 112 may be selected to provide sufficient movement based on an expected amount of difference in expansion between the elongated member 111 and the non-metallic backing structure 120. The length of the slot 151, for example, may be determined or selected based on the materials used (all other things being equal, a relatively longer slot may be used as difference between thermal coefficients of expansion of different materials becomes greater), sizes (all other things being equal, a relatively longer slot may be used as length of tool 100 or length of non-metallic backing structure 120 becomes greater), and temperature ranges (all other things being equal, a relatively longer slot used may be used as temperature range becomes greater). By limiting the range of one support plate 114 with the bracket 150, the positioning of the non-metallic backing structure 120 with respect to the elongated member 111 may be kept within a desired or acceptable range, while still allowing for the movement of support plates 114 along the longitudinal axis 112 to allow for different rates of thermal expansion. Further, the positioning of the non-metallic member 120 may be kept at or near a desired positioning or orientation of a robot used to apply material to the working surface 121 (e.g., an edge of the working surface 121 may be kept within a predetermined range of an initial position relative to the robot).

Generally, the width of the slot 151 may be sized to prevent, reduce, or minimize rotation of the bracket 150 (and support plate 114 to which the bracket 150 is coupled) relative to the elongated member 111. For example, the width of the slot 151 may provide a relatively small clearance between the slot 151 and the fastener 152. Additionally or alternatively, other structures may be employed to constrain or prevent rotation of one or more support plates 114 relative to the elongated member 111. For example, the elongated member 111 may have a polygonal cross-section, and the support plates 114 (and/or bushing supports 132) may have a polygonal opening sized to accept the polygonal elongated member with a clearance providing for sliding but not rotation. As another example, the elongated member 111 may include a keyed shaft arrangement accepted by an opening of the support plates 114 (and/or bushing supports), with the key interacting with the shaft and opening to prevent rotation of the support plates 114 relative to the elongated member 111. By constraining, limiting, inhibiting, or preventing the rotation of at least one support plate 114 relative to the elongated member 111, the non-metallic backing structure 120 (which is coupled to the support plate 114, for example via one or more fasteners) may be constrained, limited, inhibited, or prevented from rotating relative to the elongated member 111, allowing for reliable and accurate rotation of the non-metallic backing structure 120, for example, during a robotic layup process as the elongated member 111 is rotated.

Referring, e.g., to FIGS. 1 and 2, in one aspect of the disclosure, which may include at least a portion of the subject matter of any of the preceding and/or following examples and aspects, at least one of the at least one of the support plates 114 mounted to the elongated member 111 via the at least one bracket 150 is positioned proximate a longitudinal end 155 of the non-metallic backing structure 120. Thus, for example, the support plate 114 mounted via the bracket 150 may be conveniently accessed, for example, to secure the bracket 150 in place. As best seen in FIG. 5, the bracket 150 may be employed to limit a range of motion of the support plate 114 to which the bracket 150 is joined (and to indirectly limit the range of motion of other support plates 114 also joined to the non-metallic support structure). Further, with the bracket 150 disposed at the longitudinal end 155, in addition to convenient access for positioning and securing the bracket 150 in place, the bracket 150 is readily visible, allowing for visual inspection of the position of the fastener 152 within the slot 151 and the resulting position of the support plate 114 to which the bracket 150 is mounted relative to the range of available positions.

Referring, e.g., to FIGS. 1 and 2, in one aspect of the disclosure, which may include at least a portion of the subject matter of any of the preceding and/or following examples and aspects, the elongated member 111 is comprised substantially entirely of the metallic material 113, the non-metallic backing structure 120 is comprised substantially entirely of a non-metallic material 123, the non-metallic material 123 of the non-metallic backing structure 120 has a first thermal coefficient of expansion 125, the metallic material 113 of the elongated member 111 has a second thermal coefficient of expansion 115, and the first thermal coefficient of expansion 125 and the second thermal coefficient of expansion 115 are different. As discussed herein, as the non-metallic backing structure 120 expands at a different rate than the elongated member 111 during temperature changes, if the support plates 114 are rigidly affixed to both the elongated member 111 and the non-metallic backing structure 120, then issues such as buckling or bending may arise. While these issues may not present substantial difficulties, for example, over relatively small temperature ranges, it may be noted, that, for relatively larger workpieces (and larger tools) and/or large temperature ranges, differences in thermal expansion become more pronounced, and problems or issues such as buckling or bending may be exacerbated.

However, for example using mounting structures and/or tool configurations discussed herein, materials having different thermal expansion properties or characteristics may still be employed. By way of example, Aluminum, which may be used to form the elongated member 111 and/or other aspects of the support structure 110, may have a coefficient of thermal expansion of about $1.2 \times 10^{-5}$ inch/(inch*degree Fahrenheit), and Ultem, which may be used to form the non-metallic backing structure 120, may have a coefficient of thermal expansion of about $3.1 \times 10^{-5}$ inch/(inch*degree Fahrenheit). (It may be noted that Ultem may have other values depending, for example, on an amount of glass fill.) Various embodiments may be configured to provide a desired amount of float or range of float, for example, based on materials used or the size of the workpiece 190 and tool 100. For example, referring, e.g., to FIGS. 1 and 2, in one aspect of the disclosure, which may include at least a portion of the subject matter of any of the preceding and/or following examples and aspects, the elongated member 111 is comprised substantially entirely of the metallic material 113 and the non-metallic backing structure 120 is comprised substantially entirely of the non-metallic material 123. The non-metallic material 123 of the non-metallic backing structure 120 has the first thermal coefficient of expansion 125, and the metallic material 113 of the elongated member 111 has the second thermal coefficient of expansion 115. The first thermal coefficient of expansion 125 and the second thermal coefficient differ by a factor of 2.5 or more. By way of example, as discussed above, the thermal coefficients of Aluminum and Ultem may vary by more than 2.5 (e.g., 3.1/1.2=2.58).

Accordingly, as discussed herein, various embodiments provide for improved convenience, reduced time, and/or reduced cost of assembling a layup tool. Various embodiments also provide for elimination or mitigation of any issues caused by components of a layup tool being made of materials having different thermal expansion properties or characteristics, while still provide for accurate placement or location of a backing structure along an elongated member of a support structure.

Referring generally to FIGS. 1-2 and particularly to FIG. 7, one example of the present disclosure relates to a method 700 of forming the tool 100 for laying up composite material to form the workpiece 190 having the target contour 192. The method includes additively manufacturing the non-metallic backing structure 120 including the working surface 121 that includes the backing contour 122 complementary to the target contour 192 (block 702). The method also includes manufacturing the support structure 110 including support plates 114 and the elongated member 111 (block 704). Further, the method includes attaching the non-metallic backing structure 120 to the support structure 110 (block 706). As discussed herein, additive manufacturing (e.g., 3D printing) may be employed for forming the non-metallic backing structure 120, providing quick, cost-effective forming of working surface 121 and backing contour 122, while use of the support structure 110 (e.g., a support structure that is not additively manufactured) may allow for reducing the cost of material, for example using metallic materials that may be easily fabricated for the support structure 110 (but would be costly to use to provide, for example, to provide the backing contour 122).

As indicated herein, the non-metallic backing structure 120 may be additively manufacturing. However, one or more dimension of the non-metallic backing structure 120 may exceed a dimension available (or readily or conveniently available) via an additive manufacturing device, such as a 3D printer. Accordingly, referring generally to FIGS. 1-2 and 6, and particularly to FIG. 7, in one aspect of the disclosure, which may include at least a portion of the subject matter of any of the preceding and/or following examples and aspects, additively manufacturing the non-metallic backing structure 120 includes additively manufacturing plural backing-structure portions 162 (block 712), and joining the plural backing-structure portions 162 to form the non-metallic backing structure 120 (block 714). Any seams 163 resulting from the joining of the backing structure portions 162 may be filled, sanded, or otherwise finished to provide a generally smooth or continuous working surface 121. The backing structure portions 162 may be aligned with each other, for example, by corresponding pilot pins and holes disposed along the sides or edges of the plural backing structure portions 162. Additionally or alternatively, the backing structure portions 162 may be aligned by first assembling the support structure 110 (e.g., the support plates 114) in a predetermined position corresponding to alignment of the backing structure portions, and then joining the backing structure portions 162 (either together or serially) to the support plates 114 in the predetermined position.

Other aspects of the non-metallic backing structure 120 may be additively manufactured as well. For example, referring generally to FIGS. 1-2 and particularly to FIG. 7, in one aspect of the disclosure, which may include at least a portion of the subject matter of any of the preceding and/or following examples and aspects, additively manufacturing the non-metallic backing structure 120 (block 702) includes forming ribs 160 located on the surface 161 opposite of the working surface 121 (block 708), and attaching the non-metallic backing structure 120 to the support structure 110 includes securing the ribs 160 to the support structure 110 (block 710). Thus, the non-metallic support structure 120, in various embodiments, may be formed using a single pass (or portions 162 of the non-metallic support structure 120 including mounting and/or support structures such as ribs 160 may each be formed in a single pass). The ribs 160 may be configured to provide support and/or increased rigidity to the working surface 121, and/or to provide reliable and/or convenient mounting locations for the support plates 114 to be joined to the non-metallic backing structure 120.

While the non-metallic support structure 120 may be additively manufactured (for example, to improve time and/or cost of producing a relatively complex shape for the backing contour 122 for a prototype or limited production run, the support structure 110 may be subtractively manufactured (for example, to reduce cost of materials and/or processing of relatively simple or readily attainable shapes or structures used for the support structure 110). For example, referring generally to FIGS. 1-5 and particularly to FIG. 7, in one aspect of the disclosure, which may include at least a portion of the subject matter of any of the preceding and/or following examples and aspects, manufacturing the support structure 110 includes subtractively manufacturing the support plates 114 (block 716) and coupling the support plates 114 to the elongated member 111 (block 718). In various embodiments, the support plates 114 may be subtractively manufactured using conventional, convenient, and low-cost techniques utilizing readily available equipment. The subtractive manufacturing techniques may be performed automatically (e.g., under computer control) and/or manually (e.g., as part of a one-time or short-run prototyping process).

Referring generally to FIG. 4 and in particular to FIG. 7, in one aspect of the disclosure, which may include at least a portion of the subject matter of any of the preceding and/or following examples and aspects, the support plates 114 are subtractively manufactured without machining any surface of the support plates 114 (block 717). For example, openings or surfaces of the support plates 114 may be configured for clearance fits about the elongated member 111, with other components or aspects (e.g., support bushings 132) configured to provide a sliding fit with the elongated member 111. Reducing or removing the machining of the support plates 114 may help lower the cost of manufacture and/or assembly of the support structure 110 of the tool 100. Referring generally to FIG. 4 and in particular to FIG. 7, in one aspect of the disclosure, which may include at least a portion of the subject matter of any of the preceding and/or following examples and aspects, the support plates 114 are subtractively manufactured by water-jet cutting the support plates 114 (block 720). For example, the support plates 114 may be made of sheets of Aluminum or similar material that may be conveniently and cost-effectively formed using water-jet cutting.

As indicated herein, at least some amount of float or relative movement is provided between components or aspects of the tool 100 to accommodate varying rates of thermal expansion. Referring generally to FIGS. 1-5 and in particular to FIG. 7, in one aspect of the disclosure, which may include at least a portion of the subject matter of any of the preceding and/or following examples and aspects, coupling the support plates 114 to the elongated member 111 (block 718) includes allowing all but one or all of the support plates 114 to float relative to the elongated member 111 along the longitudinal axis 112 of the elongated member 111 with a sliding fit (block 722), and restraining at least one of the support plates 114 from rotating relative to the elongated member 111 (block 724). Referring, generally to FIGS. 1-2 and 5 and in particular to FIG. 7, in one aspect of the disclosure, which may include at least a portion of the subject matter of any of the preceding and/or following examples and aspects, coupling the support plates 114 to the elongated member 111 (block 718) includes fixedly attaching at least one bracket 150 to at least one of the support plates 114 (block 734), allowing the at least one bracket 150 to float relative to the elongated member 111 with the sliding fit along the longitudinal axis 112 (block 736), and restraining the at least one bracket 150 from rotating relative to the elongated member 111 (block 738). As discussed herein, the support plates 114 may be allowed to float with respect to the elongated member 111, by way of example, via the use of a sliding fit between an opening of the support structures 114 (e.g., an opening of a bushing support 132 mounted to a support structure 114), or, as another example, via a bracket including a slot (e.g., the bracket 150 having the slot 151). By allowing the support plates 114 to float relative to the elongated member 111, different thermal expansion properties or characteristics of the non-metallic backing structure 120 (which is joined to the support plates 114) and the elongated member 111 may be accounted for, and issues such as buckling or bending during temperature changes may be eliminated or reduced. By restraining at least one of the support plates 114 from rotating relative to the elongated member 111 (e.g., via a bracket mounting or a keyed shaft, among others), the non-metallic backing structure 120 (which, again, is joined to the support plates 114) may be reliably and accurately rotated and positioned during rotation of the elongated member 111 during, for example, a robotic composite forming process.

Referring generally to FIGS. 1-4 and in particular to FIG. 7, in one aspect of the disclosure, which may include at least a portion of the subject matter of any of the preceding and/or following examples and aspects, coupling the support plates 114 to the elongated member 111 (block 718) includes inserting the elongated member 111 through the first opening 130 formed in at least one of the support plates 114 (block 726), positioning the first portion 140 of the bushing support 132 adjacent to the first opening 130 and the elongated member 111 (block 728), positioning the second portion 142 of the bushing support 132 between the first opening 130 and the elongated member 111, wherein the second portion is disposed opposite to the first portion 140 about the elongated member 111 (block 730), and securing the first portion 140 and the second portion 142 of the bushing support 132 to the at least one of the support plates 114 (block 732). Use of bushing supports 132 as discussed herein may provide for ease of assembly (e.g., by improving ease of positioning the support plates 114 and/or ease of adjustability of the bushing support 132), lower cost of manufacture (e.g., by removing or reducing any required machining of the support plates 114), improve support provided by the support structure 110 (e.g., by providing a greater bearing surface than available from the relatively thin support plates 114), and/or improve ease or cost of maintenance (e.g., by providing bushing supports 132 that are easier to replace than the support plates 114).

Referring generally to FIGS. 1-2 and particularly to FIG. 8, one example of the present disclosure relates to a method 800 of forming the tool 100 for laying up composite material to form the workpiece 190 having the target contour 192.

The method includes forming the non-metallic backing structure 120 including the working surface 121 that includes the backing contour 122 complementary to the target contour 192 (block 802). The non-metallic backing structure 120 has the first thermal coefficient of expansion 125. The method also includes forming the support structure 110 that includes support plates 114 and the elongated member 111, with the elongated member 111 having the second thermal coefficient of expansion 115 different from the first thermal coefficient of expansion 125 (block 804). Further, the method includes attaching the non-metallic backing structure 120 to the support structure 110 (block 806). By using, for example, floating connections (e.g., floating with respect to the longitudinal axis 112) between the support plates 114 (as well as the non-metallic backing structure to which the support plates 114 are joined) and the elongated member, materials having varying thermal expansion properties may be accounted for, without buckling, bending, or other expansion-related issues arising due to temperature changes during a composite layup process.

Referring again to FIGS. 1-2 and 8, in one aspect of the disclosure, which may include at least a portion of the subject matter of any of the preceding and/or following examples and aspects, forming the support structure 110 includes coupling the support plates 114 to the elongated member 111 (block 808). As discussed herein, the support plates 114 may be coupled to elongated member 111, with at least some of the support plates 114 (e.g., all of the support plates 114, or all but one of the support plates 114) coupled to the elongated member 111 via a structure that allows float along the longitudinal axis 112 (e.g., a bracket with a slot, or a bushing support or other opening providing a sliding fit with the elongated member 111, among others).

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 9 and an aircraft 1102 as shown in FIG. 10. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, the aircraft 1102 produced by the illustrative method may include an airframe 1118 with a plurality of high-level systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A tool for laying up composite material to form a workpiece having a target contour, the tool comprising:
   a support structure comprising:
   an elongated member, having a longitudinal axis and comprising a metallic material;
   support plates connected to the elongated member and spaced apart from each other along the longitudinal axis, wherein all but one of the support plates or all of the support plates float relative to the elongated member along the longitudinal axis with a sliding fit; and
   a non-metallic backing structure, connected to the support plates, and comprising a working surface that comprises a backing contour, complementary to the target contour.

2. The tool of claim 1, wherein:
   at least one of the support plates further comprises:
   a first opening having a first dimension; and a bushing support, adjacent to the first opening and comprising a second opening, having a second dimension smaller than the first dimension; and the second dimension is sized to provide the sliding fit between bushing support and the elongated member along the longitudinal axis.

3. The tool of claim 2, wherein the bushing support comprises a first portion and a second portion separate from the first portion.

4. The tool of claim 1, wherein:

at least one of the support plates is coupled to the elongated member via at least one bracket that is fixedly attached to the at least one of the support plates;

the at least one bracket floats relative to the elongated member with a sliding fit along the longitudinal axis; and the at least one bracket is restrained from rotating relative to the elongated member.

5. The tool of claim 4, wherein the at least one bracket is L-shaped and comprises a slot.

6. The tool of claim 4, wherein at least one of the at least one of the support plates mounted to the elongated member via the at least one bracket is positioned proximate a longitudinal end of the non-metallic backing structure.

7. The tool of claim 1, wherein:

the elongated member is comprised entirely of the metallic material;

the non-metallic backing structure is comprised entirely of a non-metallic material;

the non-metallic material of the non-metallic backing structure has a first thermal coefficient of expansion;

the metallic material of the elongated member has a second thermal coefficient of expansion; and the first thermal coefficient of expansion and the second thermal coefficient of expansion are different.

8. The tool of claim 1, wherein:

the elongated member is comprised entirely of the metallic material;

the non-metallic backing structure is comprised entirely of a non-metallic material;

the non-metallic material of the non-metallic backing structure has a first thermal coefficient of expansion;

the metallic material of the elongated member has a second thermal coefficient of expansion; and the first thermal coefficient of expansion and the second thermal coefficient of expansion differ by a factor of 2.5 or more.

9. The tool of claim 1, wherein the non-metallic backing structure comprises a polyetherimide (PEI) material.

10. The tool of claim 1, wherein the metallic material comprises aluminum.

11. The tool of claim 1, wherein the non-metallic backing structure has a length, a height, and a width, and wherein at least one of the length, the height, or the width is greater than 36 inches.

12. The tool of claim 1, wherein:

the elongated member has an outer dimension;

the support plates comprised the metallic material; and each of the support plates comprises:

a first opening, having a first dimension greater than the outer dimension of the elongated member; and a plurality of third openings, surrounding the first opening.

13. The tool of claim 1, wherein:

the non-metallic backing structure comprises ribs, located on a surface opposite the working surface; and the support plates of the support structure are connected to the ribs.

14. The tool of claim 13, wherein the ribs comprise holes, configured to accept fasteners for securing the non-metallic backing structure to the support plates of the support structure.

15. The tool of claim 1, wherein at least one of the size or shape of the backing contour that is complementary to the target contour differs from the contour by an amount configured to account for a change in shape when the workpiece is removed from the tool.

16. The tool of claim 1, wherein at least one of the size or shape of the backing contour that is complementary to the target contour differs from the contour by an amount configured to account for a thickness of material used to form the workpiece.

17. The tool of claim 1, wherein the non-metallic material comprises an unfilled PEI.

18. The tool of claim 1, wherein the non-metallic backing structure comprises plural backing structure portions, joined together to form the non-metallic backing structure.

19. The tool of claim 18, further comprising an epoxy material, joining the plural backing structure portions together.

* * * * *